US008988763B2

(12) United States Patent
Keam et al.

(10) Patent No.: US 8,988,763 B2
(45) Date of Patent: Mar. 24, 2015

(54) PREDICTIVE ELECTROPHORETIC DISPLAY

(71) Applicant: Microsoft Corporation, Redmond, WA (US)

(72) Inventors: Nigel Stuart Keam, Redmond, WA (US); Bernard K. Rihn, Snohomish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 21 days.

(21) Appl. No.: 13/890,074

(22) Filed: May 8, 2013

(65) Prior Publication Data

US 2014/0333987 A1 Nov. 13, 2014

(51) Int. Cl.
*G02B 26/00* (2006.01)
*G09G 3/34* (2006.01)
*G02F 1/167* (2006.01)
*G09F 9/37* (2006.01)

(52) U.S. Cl.
CPC ............... *G02F 1/167* (2013.01); *G09F 9/372* (2013.01); *G09G 3/344* (2013.01)
USPC .......................................... 359/296; 345/107

(58) Field of Classification Search
CPC .......... G02F 1/167; G09G 3/344; G09F 9/372
USPC .............. 359/296; 345/107; 430/32; 204/600
See application file for complete search history.

(56) References Cited

U.S. PATENT DOCUMENTS

| 7,230,751 B2 | 6/2007 | Whitesides et al. |
| 7,804,483 B2 | 9/2010 | Zhou et al. |
| 8,174,490 B2 | 5/2012 | Whitesides et al. |
| 2008/0309636 A1 | 12/2008 | Feng et al. |
| 2010/0201657 A1 | 8/2010 | Miyazaki |

FOREIGN PATENT DOCUMENTS

| WO | WO-2008153216 | 12/2008 |
| WO | WO-2009078711 | 6/2009 |
| WO | 2011080513 A2 | 7/2011 |
| WO | 2012109018 A1 | 8/2012 |

OTHER PUBLICATIONS

Henzen, et al., "Sketching with a Low-latency Electronic Ink Drawing Tablet", Retrieved at <<http://dcs.gla.ac.uk/publications/PAPERS/8457/paper12-2005.pdf>>, In the 3rd International Conference on Computer Graphics and Interactive Techniques in Australasia and South East Asia, Nov. 29, 2005, pp. 10.
"International Search Report and Written Opinion", Application No. PCT/US2014/037039, Oct. 9, 2014, 13 Pages.

*Primary Examiner* — William Choi
(74) *Attorney, Agent, or Firm* — Jeremy Snodgrass; Judy Yee; Micky Minhas

(57) ABSTRACT

A predictive electrophoretic display is described. An electrophoretic display may include charged particles, a portion of which are designated as electronic ink, disposed between a conductive display plate and a conductive back plate. Charges may be applied to the conductive plates to migrate the electronic ink to different states. For example, the electronic ink may be positioned in an undisplayed state or in a displayed state. Further, the electronic ink may migrate through multiple intermediate states. In at least some of the intermediate states, the electronic ink may not be visible on the electrophoretic display. However, the electronic ink is configured to migrate to the displayed state faster from the intermediate state than from the undisplayed state. Portions of the electronic ink may be prepared for display on the electrophoretic display by initiating migration of electronic ink that corresponds to predicted future input to the intermediate states.

20 Claims, 7 Drawing Sheets

PREDICTIVE ELECTROPHORETIC DISPLAY

BACKGROUND

The configuration of computing devices is ever increasing. For example, use of computing devices expanded with the advent of the desktop personal computer. Configurations continued to expand and thus so too did the pervasiveness of computing devices in everyday life, such as from the desktop computer to laptop computers, netbooks, mobile communications devices such as mobile phones and tablet computers, and so on.

As these configurations continue to expand, there is an increasing focus in some instances on making devices readily usable in a variety of different environments. Displaying material so that it is easy to see what is being displayed, whether inside under indoor lighting or outside in direct sunlight, is becoming an increasingly desired feature. Some conventional displays that are easily readable in a variety of environments (e.g., both inside and outside) may suffer from other problems, however. For example, some of these displays are slow to change a state of the display, which prevents high-speed animations. When using a stylus directly on these displays for handwriting or drawing, for instance, the latency between the stylus and the "ink" appearing on the display from the stylus can be distracting to a user.

SUMMARY

A predictive electrophoretic display is described. In one or more implementations, an electrophoretic display includes charged particles, a portion of which are designated as electronic ink, disposed between a conductive display plate and a conductive back plate. Charges may be applied to the conductive plates to migrate the electronic ink to different states. For example, the electronic ink may be positioned in an undisplayed state in which the electronic ink is not visible on the electrophoretic display. The electronic ink may also be positioned in a displayed state in which the electronic ink is visible on the electrophoretic display. Further, the electronic ink may be migrated through multiple intermediate states. In at least some of the intermediate states, the electronic ink may not be visible to a human eye. However, the electronic ink is configured to migrate to the displayed state faster from the intermediate states than from the undisplayed state.

In one or more implementations, a future input for displaying electronic ink on an electrophoretic display is predicted based on user input. Based on the predicted future input, the electronic ink may be prepared for display on the electrophoretic display, such as by initiating migration of the electronic ink to the intermediate states. When a subsequent user input for displaying the electronic ink on the electrophoretic display is received, the migrating electronic ink corresponding to the subsequent user input may be displayed. Additionally, the migrating electronic ink that does not correspond to the subsequent user input may be returned to an unprepared state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

As previously described, computing devices may assume a variety of configurations and be employed for a variety of different uses. However, some of these configurations were conventionally less suited for supporting some functionality than other configurations. For example, conventional display capable devices may be configured to display material so that it is easily viewable in a variety of different environments. When such devices are used to display material based on user input, however, there is oftentimes a noticeable delay between receiving the user input and displaying the material. This delay may be distracting to a user, such as when the user is using a stylus for handwriting or drawing directly on a display of a device.

A predictive electrophoretic display is described. In one or more implementations, a computing device is configured to include an electrophoretic display having electronic ink that may migrate between an undisplayed state, a displayed state, and intermediate states. For example, the electronic ink may be migrated to the different states while a user is handwriting or drawing on the electrophoretic display using a stylus.

The computing device is also configured to include a predictive input module to predict user input, e.g., using trajectory and acceleration of the stylus to predict where the stylus is moving on the electrophoretic display. The predicted input may be used to prepare some of the electronic ink for display, e.g., by first causing portions of the electronic ink to migrate to the intermediate states. In the intermediate states, the electronic ink is located between the undisplayed state and the displayed state, but may not be visible or may have limited visibility to the human eye, e.g., in comparison with the displayed state. From the intermediate states, the electronic ink is configured to migrate to the displayed state faster than from the undisplayed state.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
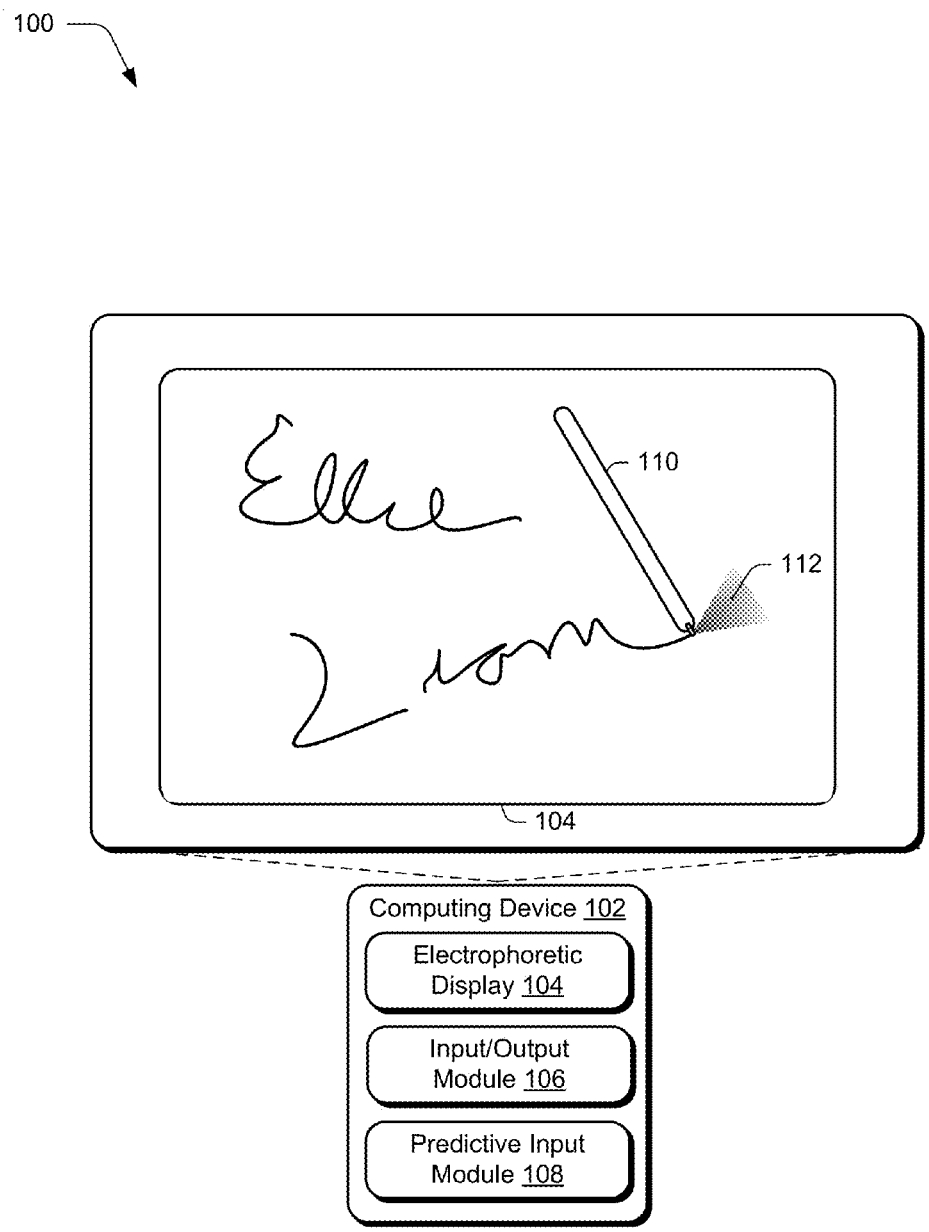
FIG. 1 is an illustration of an environment in an example implementation that is operable to employ a predictive electrophoretic display as described herein.

FIG. 1 is an illustration of an environment 100 in an example implementation that is operable to employ techniques described herein. The illustrated environment 100 includes an example of a computing device 102 having an electrophoretic display 104, an input/output module 106, and a predictive input module 108.

The computing device 102 may be configured in a variety of ways. For example, the computing device 102 may be configured such that the electrophoretic display 104 is a primary (or only) display. On the other hand, the computing device 102 may be configured to include the electrophoretic display 104 (e.g., as an input device) as well as another display. Examples of device configurations that may include electrophoretic displays can be found in desktop and laptop computers, televisions and other display monitors, table-top computers, electronic visual displays and digital signs, mobile phones, tablet computers, portable game devices, music players, and so on. Thus, the computing device 102 may range from full resource devices with substantial memory and processor resources to low-resource devices with limited memory and/or processing resources.

The electrophoretic display 104 is configured to display electronic ink. In particular, the display of electronic ink by the electrophoretic display 104 may be designed to mimic the appearance of ordinary ink on paper. In contrast to backlit displays which emit light, the electrophoretic display 104 may be configured to reflect light like ordinary paper. This may make the electrophoretic display 104 more comfortable to read, and enable displayed images to be viewed at a wider viewing angle than some backlit displays. In addition, images displayed on the electrophoretic display 104 may be viewed by a user in direct sunlight without appearing to fade. The electrophoretic display may also be configured to consume less power than other display devices, such as LEDs and so on.

The electronic ink of the electrophoretic display 104 may be implemented using charged particles that are suspended within a fluid. When an electric field is applied across a capsule containing the charged particles, positively-charged particles migrate to one side of the capsule and negatively-charged particles migrate to another side of the capsule. The physical position of these charged particles in the fluid may be modeled using linear interpolation techniques. In particular, the linear interpolation techniques may model the physical position of the charged particles based on a ratio between an electrical force applied to the capsules and a retarding or viscous force of the fluid. These techniques may be used to determine when to begin migration of the charged particles that are designated as electronic ink for display on the electrophoretic display, e.g., when timing the migration of particles so that the electronic ink becomes visible at a particular time. Since different types of particles may be used in different implementations (e.g., black and white, color, greyscale, etc.), the linear interpolation techniques may also depend on a type of particles suspended within the capsules.

In one or more implementations, a capsule may contain black particles charged one way and white particles that are oppositely charged. Thus, when an electric field is applied across the capsule the white particles may migrate to one side of the capsule and the black particles may migrate to the other side of the capsule. In this way, the black particles may be designated as the "ink" and the white particles may be designated as the background. Alternately, the white particles may be designated as the "ink" and the black particles may be designated as the back ground. Consequently, black "ink" may be displayed on a white background or white "ink" may be displayed on a black background.

Additionally or alternately, the electrophoretic display 104 may be configured to display color, such as by using color filters with black and white particles and/or by using colored particles. The electrophoretic display 104 may also be configured for greyscale display. Although suspending particles within a fluid is discussed, the electrophoretic display may be implemented in a variety of ways without departing from the spirit and scope of techniques described herein.

In one or more implementations, the electronic ink is disposed between two conductive plates. For example, the electronic ink may be disposed between a back plate and a display plate. The display plate may be transparent, enabling the electronic ink to be seen through the display plate. Although the display plate may be configured as a display surface of the electrophoretic display 104, in other implementations the display plate may merely be adjacent to the display surface, e.g., when covered with cover glass.

In any case, the conductive plates are configured to be charged at particular regions so that electrical fields may be applied to corresponding portions of the electronic ink. By applying electrical fields to particular portions of the electronic ink, text and/or images may be displayed on the electrophoretic display 104. For example, capsules that contain the electronic ink may correspond to pixels of the electrophoretic display 104. Regions of the conductive plates may be charged to apply an electrical field across particular pixels, and may be configured to do so independent of other pixels. In this way, the charged particles designated as the electronic ink may be made visible in some pixels but not in others based on where charges are applied to the conductive plates. Once the electronic ink in a pixel is made visible it may remain visible without continuing to apply the electrical field across the pixel. Consequently, the electrophoretic display 104 may be configured to hold an image and/or text indefinitely without using electricity. This may cause the electrophoretic display 104 to have reduced power consumption in comparison to other displays.

Based on charges applied to the conductive plates, the electronic ink may be migrated between and located in different states. Using the linear interpolation techniques described in more detail above, the state of the electronic ink may be predicted. The electronic ink may, for example, be positioned in an undisplayed state. Naturally, the particles designated as the electronic ink are not visible to the human eye while positioned in the undisplayed state. As discussed above, a capsule can have black and white particles and an electrical field may be applied to the capsule so that it is made black or white. In an implementation where the "ink" is black and the background is white, in the undisplayed state the black particles may be occluded (e.g., hidden) by the white particles. Specifically, the black particles may be located proximate to the conductive back plate of the electrophoretic display 104 and the white particles located proximate to the conductive display plate. Thus, the black "ink" is not visible.

The electronic ink may also be positioned in a displayed state. In the displayed state, the electronic ink is visible to the human eye. Continuing with the example where the "ink" is black and the background is white, in the displayed state the black particles may hide the white particles. In particular, the black particles may be located proximate to the conductive display plate of the electrophoretic display 104 and the white particles located proximate to the conductive back plate.

Additionally, the electronic ink may be located in a range of intermediate states between the undisplayed state and the displayed state. In some of the intermediate states, the electronic ink may not be visible and/or have limited visibility by the human eye. However, from the intermediate states migration of the electronic ink to the displayed state may be faster than from the undisplayed state. By preemptively migrating the particles from the undisplayed state (so that they are located in the range of intermediate states), the latency between receiving an input and actually displaying the electronic ink may be reduced. In the continuing example, the black "ink" particles may still be hidden by the white particles in some of the intermediate states. In the intermediate states, the black and the white particles may also both be located near the middle of a capsule (rather than located across the capsule proximate to a corresponding conductive plate as in the displayed and undisplayed states).

To cause the electronic ink to be located in the range of intermediate states, drive voltages and currents may be adjusted to adjust the charges applied to the conductive plates. In one or more implementations, temporal dithering techniques (e.g., pulse-width modulation) may be used to position the electronic ink in the intermediate states. Additionally, partial charges may be applied to the conductive plates to generate an electrical field that causes the ink to be migrated to and/or positioned in the intermediate state.

From the intermediate states, the particles may not only be migrated to the displayed state, but may also be migrated to the undisplayed state. For example, an electrical field may be applied to a capsule to reverse the migration of the electronic ink so that it returns from the intermediate states to the undisplayed state. In particular, the migration may be reversed and the electronic ink returned to the undisplayed state when it is determined that the electronic ink corresponds to an incorrect prediction. In this way, portions of the electronic ink may be prepared for display but need not be advanced to the display state if input is not received to display the electronic ink.

The illustrated configuration also shows that the computing device 102 may include an input/output module 106. The input/output module 106 may be configured to receive input through the electrophoretic display 104, such as based on contact of a stylus 110 or a finger with the electrophoretic display. The input/output module 106 may also be configured to receive input from a keyboard (not shown). The keyboard may be external to the electrophoretic display 104, such as attached to the computing device 102 or disposed on a housing of the computing device. In one or more implementations, the keyboard may be displayed on the electrophoretic display 104, such that keys of the keyboard may be selected through touch contact with the electrophoretic display. It should be apparent that the input/output module 106 may be configured to receive a variety of inputs and is not limited to stylus, touch, and keyboard input.

Additionally, the input/output module 106 may be configured to cause text and images to be displayed on the electrophoretic display 104. For example, the input/output module 106 may be configured to cause the electronic ink to appear on the electrophoretic display where the stylus 110 has made contact with the electrophoretic display. In this way, the stylus 110 may be used to draw or write on the electrophoretic display 104. The input/output module 106 may also be configured to cause characters to be displayed on the electrophoretic display 104 according to input received from a keyboard. It should be noted that the input/output module 106 may cause the electrophoretic display 104 to display a variety of images and text in addition to those described herein.

As noted above, the illustrated computing device 102 may also include a predictive input module 108. The predictive input module 108 may be configured to predict user input. For example, the stylus 110 may be used to draw or write on the electrophoretic display 104. Based on a path of the drawing or writing, the predictive input module 108 may be configured to predict where the stylus 110 is likely move on the electrophoretic display 104. For example, the input/output module 106 may determine a trajectory, an acceleration, and/or a speed of the stylus 110. In another example, another module (e.g., the predictive input module may) determine the trajectory, the acceleration, and/or the speed of the stylus 110. Using this information, the predictive input module 108 may be configured to predict future contact of the stylus 110 with the electrophoretic display 104. In a similar fashion, the predictive input module 108 may be configured to predict future contact of a finger with the electrophoretic display.

The predictive input module 108 may also be configured to predict user input based on keyboard input that has already been received. For example, characters may be received by the input/output module 106 that form a portion of a word. Based on the portion of the word, the predictive input module 108 may be configured to determine what characters are likely to be entered next.

As discussed above, portions of the electronic ink of the electrophoretic display 104 may be prepared for display, e.g., by migrating the electronic ink to the range of intermediate states. To reduce the latency between receiving a user input and actually displaying electronic ink on the electrophoretic display 104, the portions of electronic ink that are prepared for display may correspond to the future input predicted by the predictive input module 108. When stylus input is received on the electrophoretic display 104, for instance, the predictive input module 108 may predict that the stylus is next likely to make contact with the electrophoretic display in a cone-shaped area of electrophoretic display. In FIG. 1 a cone-shaped region 112 is illustrated on the electrophoretic display 104 having its apex proximate to the tip of the stylus 110. The cone-shaped region 112 may correspond to where the predictive input module 108 predicts that the stylus is next likely to make contact with the electrophoretic display. Thus, electronic ink, corresponding to the cone-shaped region 112 may be prepared for display.

As noted above, when keyboard input is received the predictive input module 108 may predict multiple characters that are likely to be entered next on the keyboard. As a result, the predicted input may correspond to multiple characters. Accordingly, the portion of electronic ink that is prepared for display may correspond to a shape that is a combination of the multiple predicted characters.

Figure 2:
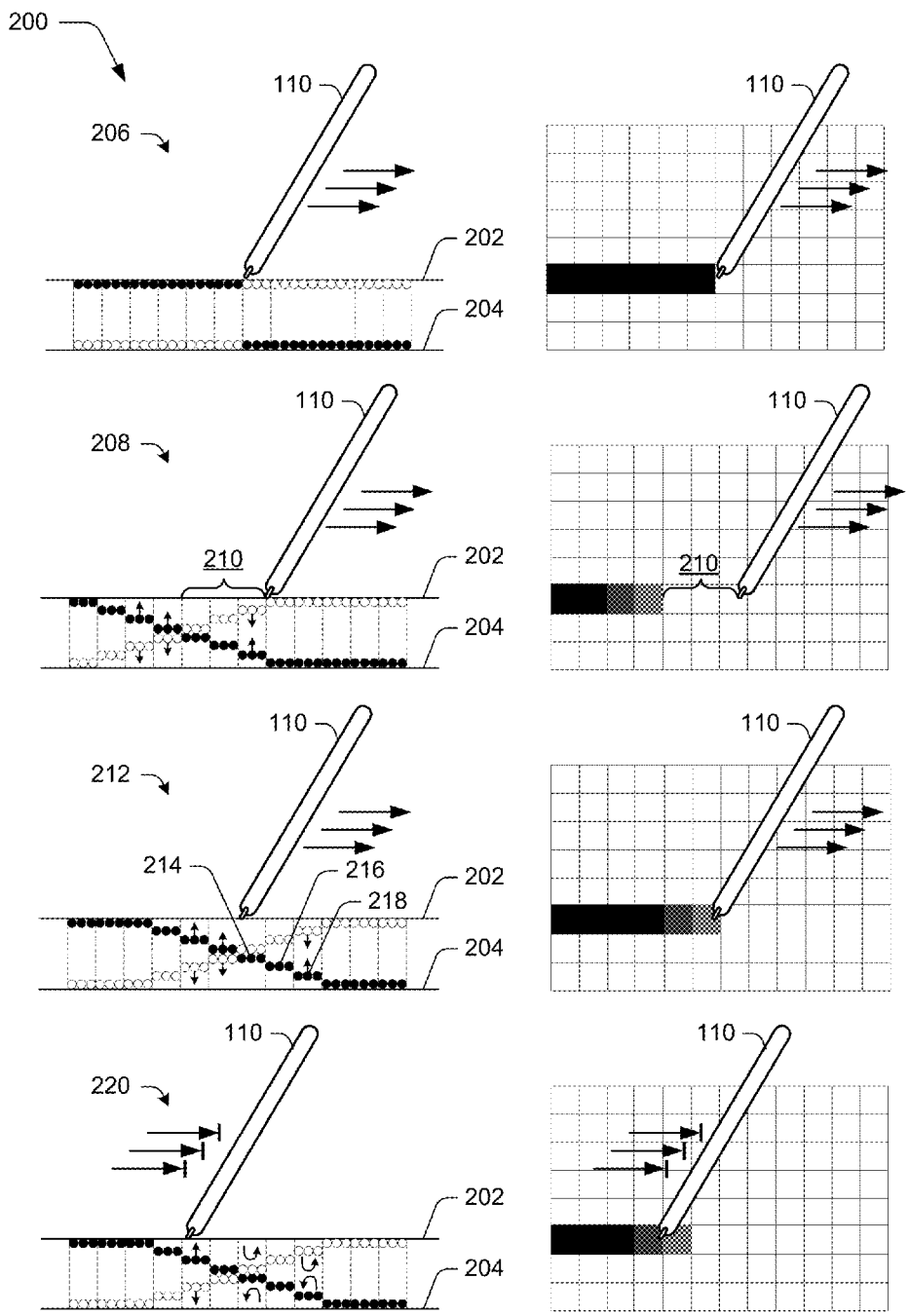
FIG. 2 depicts multiple examples of electronic ink disposed within conductive plates of an electrophoretic display and that is migrated between different states.

FIG. 2 depicts multiple examples 200 of charged particles disposed within conductive plates 202, 204 of an electrophoretic display. In these examples, the black particles are designated as the electronic ink Example 206 depicts an ideal migration of the electronic ink from an undisplayed state to a displayed state. In particular, the example at 206 depicts that the electronic ink is immediately migrated from an undisplayed state to a displayed state (i.e., no transition time). In the ideal migration shown at 206, the "ink" appears on the electrophoretic display exactly when and where the stylus 110 contacts the conductive plate 202. In reality, however, the electronic ink does take time to migrate from the undisplayed state to the displayed state.

The example shown at 208 depicts a migration of the electronic ink begun after input by the stylus 110 is received. Waiting to begin migration until input is received delays display of the electronic ink at least as long it takes the electronic ink to migrate from the undisplayed state to the displayed state. In the example at 208, for instance, the "ink" appears to follow the stylus 110. In other words, the ink appears on the electrophoretic display a distance 210 behind where the stylus 110 contacts the conductive plate 202. As noted above, the delay between providing stylus input and seeing the corresponding "ink" appear on the display may be distracting to a user. Thus, devices that wait to begin migration of the electronic ink until user input is received may be unsuitable for some purposes.

The example shown at 212 depicts a migration of the electronic ink from an undisplayed state which has begun before input by the stylus is received. For example, the electronic ink at 214, 216, 218, which is ahead of the stylus 110 (based on the direction the stylus is moving), has begun migration from the undisplayed state. The electronic ink at 214, 216, 218 may, for instance, correspond to predicted user input, e.g., user input predicted by the predictive input module 108.

Although the electronic ink at 214, 216, 218 has begun migration from the undisplayed state, it should be noted that the stylus has not yet made contact with corresponding portions of the electrophoretic display. Indeed, the stylus may not make contact with the corresponding portions of the electrophoretic display as predicted. A user may, for instance, lift the stylus from the electrophoretic display, stop moving the stylus, and so on.

The example shown at 220 depicts a migration of the electronic ink that is reversed. For example, migration of the ink from the undisplayed state may have begun as shown in the example at 212. However, as depicted in the example at 220 movement of the stylus 110 across the electrophoretic display may be stopped. Consequently, the ink that began migration ahead of the stylus 110 is not to be displayed based on the input. To stop the migrating electronic ink from being displayed, the migration of the electronic ink may be reversed, e.g., reversed from an intermediate state back to the undisplayed state. Migration of the electronic ink may be reversed, for instance, for portions of electronic ink that are prepared for display based on predicted input but for which actual input does not end up being received.

Figure 3A:
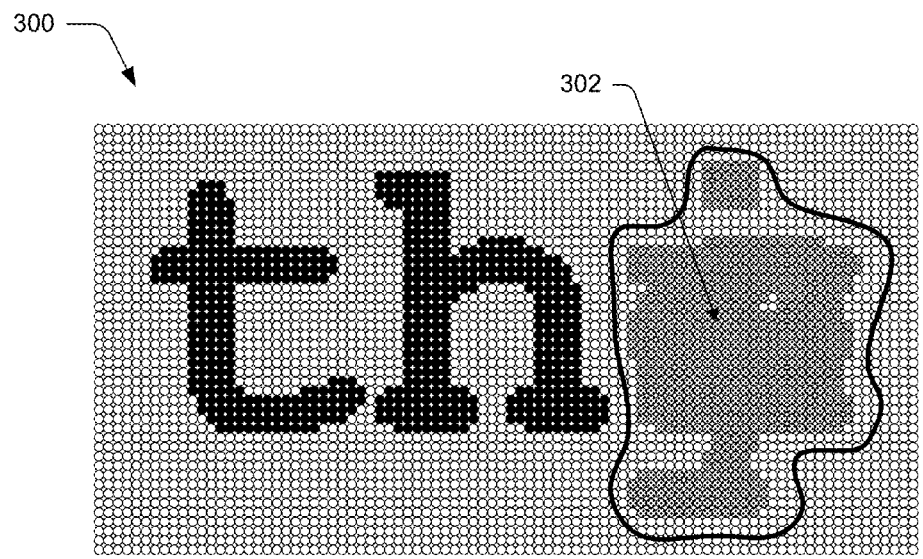
FIG. 3A depicts an example implementation showing electronic ink that is prepared for migration based on predicted user input.

FIG. 3A depicts an example implementation 300 showing electronic ink that is prepared for migration based on predicted user input. In the illustrated example, electronic ink is already displayed for the letters "t" and "h", which may be displayed according to input received from a keyboard that corresponds to those letters. Based on having already received the letters "t" and "h" the predictive input module 108 may predict that the characters that are likely to be entered next are "e", "r", "a", "i", "o", and "y". For example, the predictive input module 108 may use a dictionary lookup to determine that these letters are likely to be entered next. As such, the predicted input may correspond to a shape comprising a combination of these letters. In the example shown at 300, a shape 302 which combines "e", "r", "a", "i", "o", and "y" is depicted as being prepared for display (e.g., corresponding electronic ink positioned in the intermediate states).

Figure 3B:
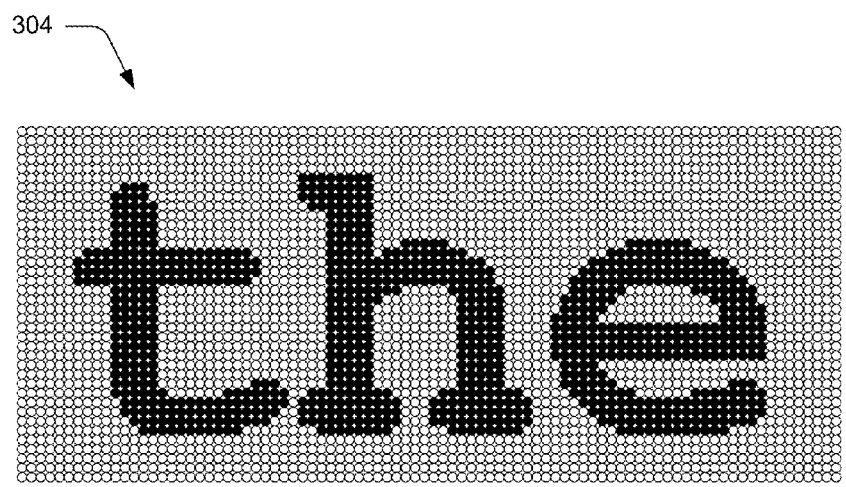
FIG. 3B depicts an example implementation showing electronic ink that is positioned in a displayed state based on received user input.

FIG. 3B depicts an example implementation 304 showing electronic ink that is positioned in a displayed state based on received user input. Specifically, FIG. 3B depicts that the letter "e" is displayed, e.g., responsive to a keyboard entry corresponding to the letter "e". To do so, the electronic ink that was preemptively migrated from the undisplayed state and corresponding to the letter "e" may have be advanced from the intermediate states to the displayed state. However, the electronic ink that was prepared for display but is not to be displayed may be returned to the undisplayed state, e.g., the ink corresponding to the letters "r", "a", "i", "o", and "y" but not to "e".

Figure 4:
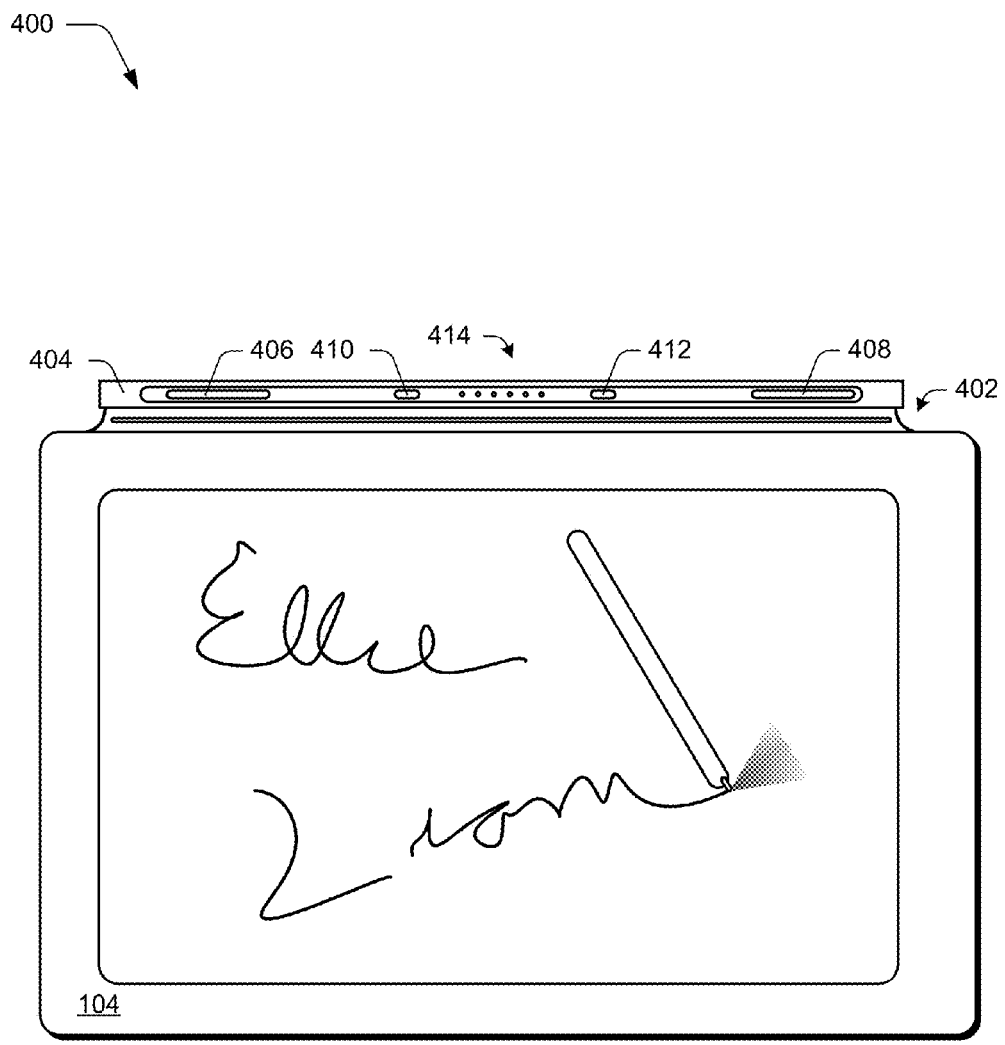
FIG. 4 depicts an example implementation of a predictive electrophoretic display configured as an input device that is connectable to a computing device and showing a flexible hinge.

FIG. 4 depicts an example implementation 400 of the electrophoretic display 104 of FIG. 1 configured as an input device for a computing device (not shown). In particular, FIG. 4 shows a flexible hinge 402 that connects the electrophoretic display 104 to the computing device. In this example, a connection portion 404 of the input device is shown that is configured to provide a communicative and physical connection between the electrophoretic display 104 and the computing device. The connection portion 404 as illustrated has a height and cross section configured to be received in a channel in the housing of the computing device, although this arrangement may also be reversed without departing from the spirit and scope thereof.

The connection portion 404 is flexibly connected to a portion of the electrophoretic display 104 through use of the flexible hinge 402. Thus, when the connection portion 404 is physically connected to the computing device the combination of the connection portion 404 and the flexible hinge 402 supports movement of the electrophoretic display 104 in relation to the computing device that is similar to a hinge of a book.

Through this rotational movement, a variety of different orientations of the electrophoretic display 104 in relation to the computing device may be supported. For example, rotational movement may be supported by the flexible hinge 402 such that the electrophoretic display 104 may be placed against a display surface of the computing device and thereby act as a cover. Thus, the electrophoretic display 104 may act to protect a display surface of the computing device from harm.

The connection portion 404 may also be used to cover both the front (e.g., the display surface) and back (e.g., opposing side of the housing from the display surface) of the computing device. In one or more implementations, electrical and other connectors may also be disposed along the sides of the computing device and/or the electrophoretic display 104, e.g., to provide auxiliary power when closed.

Naturally, a variety of other orientations are also supported. For instance, the computing device and electrophoretic display 104 may assume an arrangement such that both are laid flat against a surface. Other instances are also contemplated, such as a tripod arrangement, meeting arrangement, presentation arrangement, and so forth.

Returning again to FIG. 4, the connection portion 404 is illustrated in this example as including magnetic coupling devices 406, 408, mechanical coupling protrusions 410, 412, and a plurality of communication contacts 414. The magnetic coupling devices 406, 408 are configured to magnetically couple to complementary magnetic coupling devices of the computing device through use of one or more magnets. In this way, the electrophoretic display 104 may be physically secured to the computing device through use of magnetic attraction.

Figure 5:
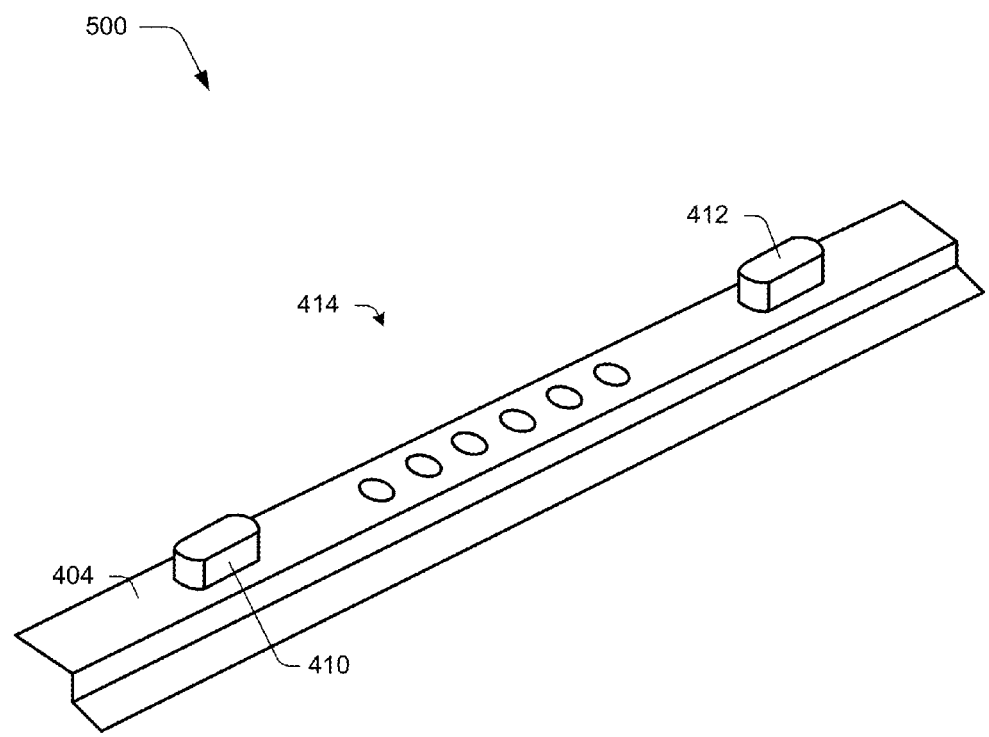
FIG. 5 depicts an example implementation showing a perspective view of a connection port of FIG. 4 that includes mechanical coupling protrusions and a plurality of communication contacts.

The connection portion 404 also includes mechanical coupling protrusions 410, 412 to form a mechanical physical connection between the electrophoretic display 104 and the computing device. The mechanical coupling protrusions 410, 412 are shown in greater detail in relation to FIG. 5, which is discussed below FIG. 5 depicts an example implementation 500 showing a perspective view of the connection portion 404 of FIG. 4 that includes the mechanical coupling protrusions 410, 412 and the plurality of communication contacts 414. As illustrated, the mechanical coupling protrusions 410, 412 are configured to extend away from a surface of the connection portion 404, which in this case is perpendicular although other angles are also contemplated.

The mechanical coupling protrusions 410, 412 are configured to be received within complimentary cavities within the channel of the computing device. When so received, the mechanical coupling protrusions 410, 412 promote a mechanical binding between the devices when forces are applied that are not aligned with an axis that is defined as corresponding to the height of the protrusions and the depth of the cavity.

The connection portion 404 is also illustrated as including a plurality of communication contacts 414. The plurality of communication contacts 414 is configured to contact corresponding communication contacts of the computing device to form a communicative coupling between the devices. Other examples are also contemplated, such as a dedicated slate configuration of the computing device 102 as shown in FIG. 1.

Example Procedures

The following discussion describes predictive electrophoretic display techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the examples in FIGS. 2, 3A, and 3B.

Figure 6:
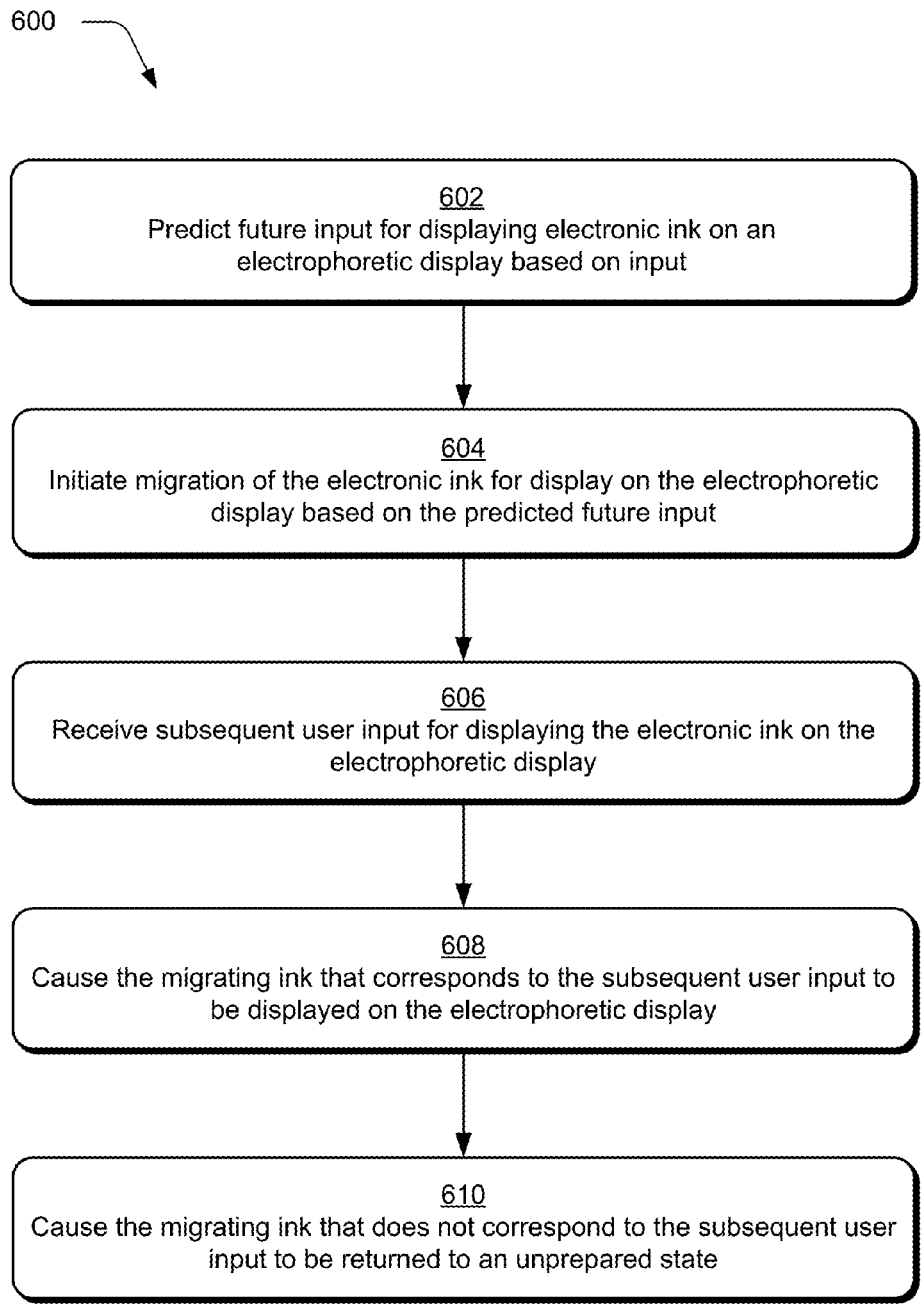
FIG. 6 is a flow diagram depicting a procedure in an example implementation in which electronic ink of a predictive electrophoretic display is prepared for display based on predicted input and then displayed or returned to an unprepared state based on subsequent input.

FIG. 6 depicts a procedure 600 in an example implementation in which electronic ink of a predictive electrophoretic display is prepared for display based on predicted input and then displayed or returned to an unprepared state based on subsequent input. Future input for displaying electronic ink on an electrophoretic display is predicted based on input (block 602). For example, the letters "t" and "h" may have already been entered by a user on a keyboard as in FIG. 3A, and the predictive input module 108 may consult one or more dictionaries to determine that the user is likely to next enter "e", "r", "a", "i", "o" or "y".

Based on the predicted future input, migration of portions of the electronic ink may be initiated (block 604). For example, when the predictive input module 108 predicts that a user is next likely to enter "e", "r", "a", "i", "o", or "y", electronic ink in a shape that combines these letters may be prepared for display. In particular, the electronic ink that corresponds to this shape may begin migration to the intermediate states, e.g., by applying charges to the conductive plates to cause migration the electronic ink.

A subsequent user input for displaying electronic ink on the electrophoretic display may be received (block 606). For example, the input/output module 106 may receive a keyboard input corresponding to the letter "e". The electronic ink that has begun migration and corresponds to the subsequent user input may then be displayed (block 608). For example, electronic ink from the portion of ink depicted as migrating in FIG. 3A and that corresponds to the letter "e", may be displayed (as depicted in FIG. 3B). To do so, the migrating electronic ink corresponding to the letter "e" may be allowed to advance from the intermediate states to the displayed state by maintaining the charge on the conductive plate.

The migrating ink that does not correspond to the subsequent user input, however, may be returned to an unprepared state (block 610). For example, electronic ink located in the intermediate states may be migrated back from the intermediate states to the undisplayed state. In other words, the migration of electronic ink may be reversed. In the continuing example, in which electronic ink for the letters "e", "r", "a", "i", "o", and "y" is migrated but in which "e" is then entered on the keyboard, the electronic ink corresponding to the letters "r", "a", "i", "o", and "y" but not to "e" may be returned.

Example System

Figure 7:
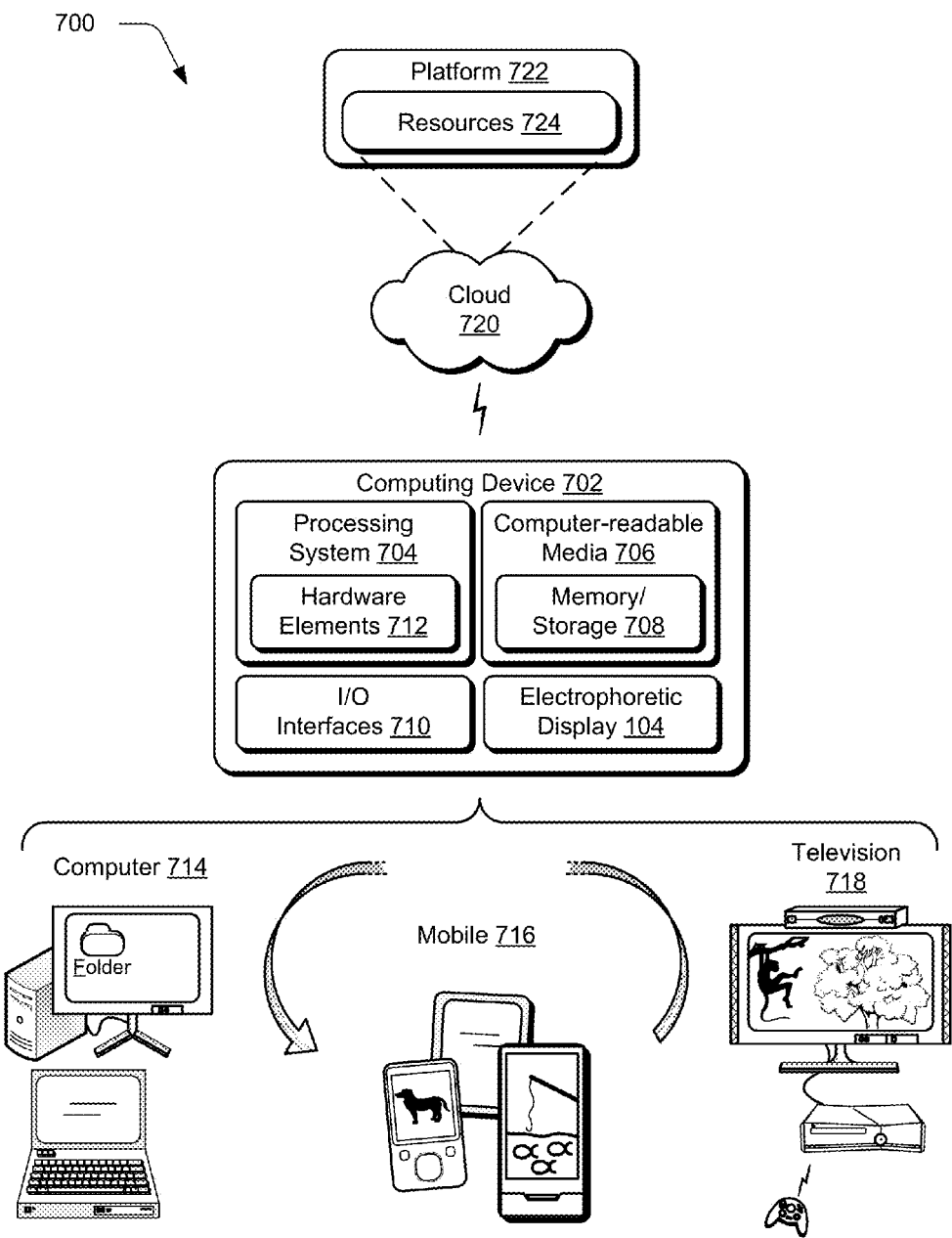
FIG. 7 illustrates various components of an example system that can be employed to implement aspects of the techniques described herein.

FIG. 7 illustrates an example system generally at 700 that includes an example computing device 702 that is representative of one or more computing systems and/or devices that may implement the various techniques described herein. The computing device 702 may, for example, be configured with an electrophoretic display 104 and a predictive input module 108. The predictive input module 108 may be configured to predict future user input that is used to suspend electronic ink in an intermediate state between an undisplayed state and a displayed state of the electronic ink.

The example computing device 702 includes a processing system 704 that may incorporate one or more processors or processing devices, one or more computer-readable media 706 which may include one or more memory and/or storage components 708, and one or more input/output (I/O) interfaces 710 for input/output (I/O) devices. Computer-readable media 706 and/or one or more I/O devices may be included as part of, or alternatively may be coupled to, the computing device 702. As illustrated, the processing system 704 may also include one or more hardware elements 712 representative of functionality to implement at least some aspects of the procedures and techniques described herein in hardware. Although not shown, the computing device 702 may further include a system bus or data transfer system that couples the various components one to another. A system bus can include any one or combination of different bus structures, such as a memory bus or memory controller, a peripheral bus, a universal serial bus, and/or a processor or local bus that utilizes any of a variety of bus architectures.

The processing system 704, processors, and hardware elements 712 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 708 represents memory/storage capacity associated with one or more computer-readable media. The memory/storage component 708 may include volatile media (such as random access memory (RAM)) and/or nonvolatile media (such as read only memory (ROM), Flash memory, optical disks, magnetic disks, and so forth). The memory/storage component 708 may include fixed media (e.g., RAM, ROM, a fixed hard drive, etc.) as well as removable media (e.g., a Flash memory drive, a removable hard drive, an optical disk, and so forth).

Input/output interface(s) 710 allow a user to enter commands and information to computing device 702, and also allow information to be presented to the user and/or other components or devices using various input/output devices. Examples of input devices include a keyboard, a cursor control device (e.g., a mouse), a microphone (e.g., which may be configured to receive voice input), a scanner, touch functionality (e.g., capacitive or other sensors that are configured to detect physical touch), a camera (e.g., which may employ visible or non-visible wavelengths such as infrared frequencies to recognize movement as gestures), and so forth. Examples of output devices include a display device (e.g., a monitor or projector), speakers, a printer, a network card, tactile-response device, and so forth. Thus, the computing device 702 may be configured in a variety of ways to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media.

As previously described, hardware elements 712 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 712. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 712 of the processing system 704. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on. The techniques described herein may be supported by these various configurations of the computing device 702 and are not limited to the specific examples the techniques described herein.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of the functionality described herein may be distributed throughout the system 700. For example, the functionality may be implemented in part on the computing device 702 as well as via the platform 722 that abstracts the functionality of the cloud 720.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. An electrophoretic display comprising:
 a conductive display plate and a conductive back plate; and
 charged particles disposed between the conductive display plate and the conductive back plate that, based on charges applied to the conductive plates, are configured to enable a portion of the charged particles designated as electronic ink to migrate between:
  an undisplayed state in which the electronic ink is not visible on the electrophoretic display;
  a displayed state in which the electronic ink is visible on the electrophoretic display; and
  intermediate states in which the electronic ink is configured to migrate to the displayed state faster than from the undisplayed state, in at least some of the intermediate states the electronic ink is not visible on the electrophoretic display.

2. An electrophoretic display as described in claim 1, wherein the electronic ink when located in the undisplayed state is configured to migrate to the intermediate states based on the charges applied to the conductive plates.

3. An electrophoretic display as described in claim 1, wherein the electronic ink when located in the intermediate states is configured to migrate to the displayed state based on the charges applied to the conductive plates.

4. An electrophoretic display as described in claim 1, wherein the electronic ink when located in the intermediate states is configured to migrate to the undisplayed state based on the charges applied to the conductive plates.

5. An electrophoretic display as described in claim 1, wherein the charged particles are separated into multiple pixels, and the electronic ink in each said pixel is configured to migrate between the undisplayed state, the intermediate states, and the displayed state independent of the electronic ink in other said pixels.

6. An electrophoretic display as described in claim 1, wherein the electronic ink is configured to migrate between the undisplayed state, the intermediate states, and the displayed state such that different portions of the electronic ink are in different said states at a particular time.

7. An electrophoretic display as described in claim 1, wherein migration of the electronic ink from one said state to another is reversible during the migration based on the charges applied to the conductive plates.

8. An electrophoretic display as described in claim 1, wherein the conductive display plate is transparent.

9. A device comprising:
 an electrophoretic display including electronic ink disposed between conductive plates that, based on charges applied to the conductive plates, is positioned in one of:
  an undisplayed state;
  a displayed state in which the electronic ink is visible on the electrophoretic display; and
  multiple intermediate states between the undisplayed state and the displayed state; and
 a predictive input module configured to predict user input for displaying electronic ink on the electrophoretic display and initiating migration of a portion of the electronic ink corresponding to the predicted user input to the intermediate states.

10. A device as described in claim 9, wherein the electronic ink is configured to migrate to the displayed state faster from the intermediate states than from the undisplayed state.

11. A device as described in claim 9, wherein the electronic ink located in the intermediate states is configured to be advanced to the displayed state responsive to receiving a user input for displaying the electronic ink on the electrophoretic display.

12. A device as described in claim 9, wherein the electronic ink that corresponds to already-received user input for displaying electronic ink on the electrophoretic display is positioned in the displayed state.

13. A device as described in claim 9, wherein the electronic ink is not visible on the electrophoretic display while positioned in the undisplayed state and at least some of the intermediate states.

14. A device as described in claim 9, wherein the portion of electronic ink for which migration to the intermediate states is initiated is cone-shaped when the predicted user input is associated with a stylus or touch input.

15. A device as described in claim 9, wherein the portion of electronic ink for which migration to the intermediate states is initiated has a shape formed by combining multiple characters that are likely to be entered when the predicted user input is associated with keyboard input.

16. A device as described in claim 9, further comprising an input/output module configured to receive a subsequent input, wherein the electronic ink for which migration to the intermediate states is initiated but does not correspond to the subsequent input is migrated to the undisplayed state.

17. A device as described in claim 9, further comprising an input/output module configured to receive a subsequent input, wherein the electronic ink for which migration to the intermediate states is initiated and that corresponds to the subsequent input is advanced to the displayed state.

18. A computing device comprising:
   an input/output module configured to detect outputs for display by an electrophoretic display;
   a predictive input module configured to predict future inputs for display on the electrophoretic display based at least in part on the detected inputs; and
   the electrophoretic display including:
      a conductive display plate and a conductive back plate; and
      charged particles disposed between the conductive display plate and the conductive back plate that, based on charges applied to the conductive plates, are configured to enable a portion of the charged particles designated as electronic ink to migrate between:
         an undisplayed state in which the electronic ink is not visible on the electrophoretic display;
         a displayed state in which the electronic ink is visible on the electrophoretic display; and
         intermediate states in which the electronic ink is configured to migrate to the displayed state faster than from the undisplayed state, in at least some of the intermediate states the electronic ink is not visible on the electrophoretic display.

19. A computing device as described in claim 18, wherein the electronic ink when located in the undisplayed state is configured to migrate to the intermediate states based on the charges applied to the conductive plates.

20. An computing device as described in claim 18, wherein the electronic ink when located in the intermediate states is configured to migrate to the displayed state based on the charges applied to the conductive plates.

* * * * *